Patented Feb. 2, 1943

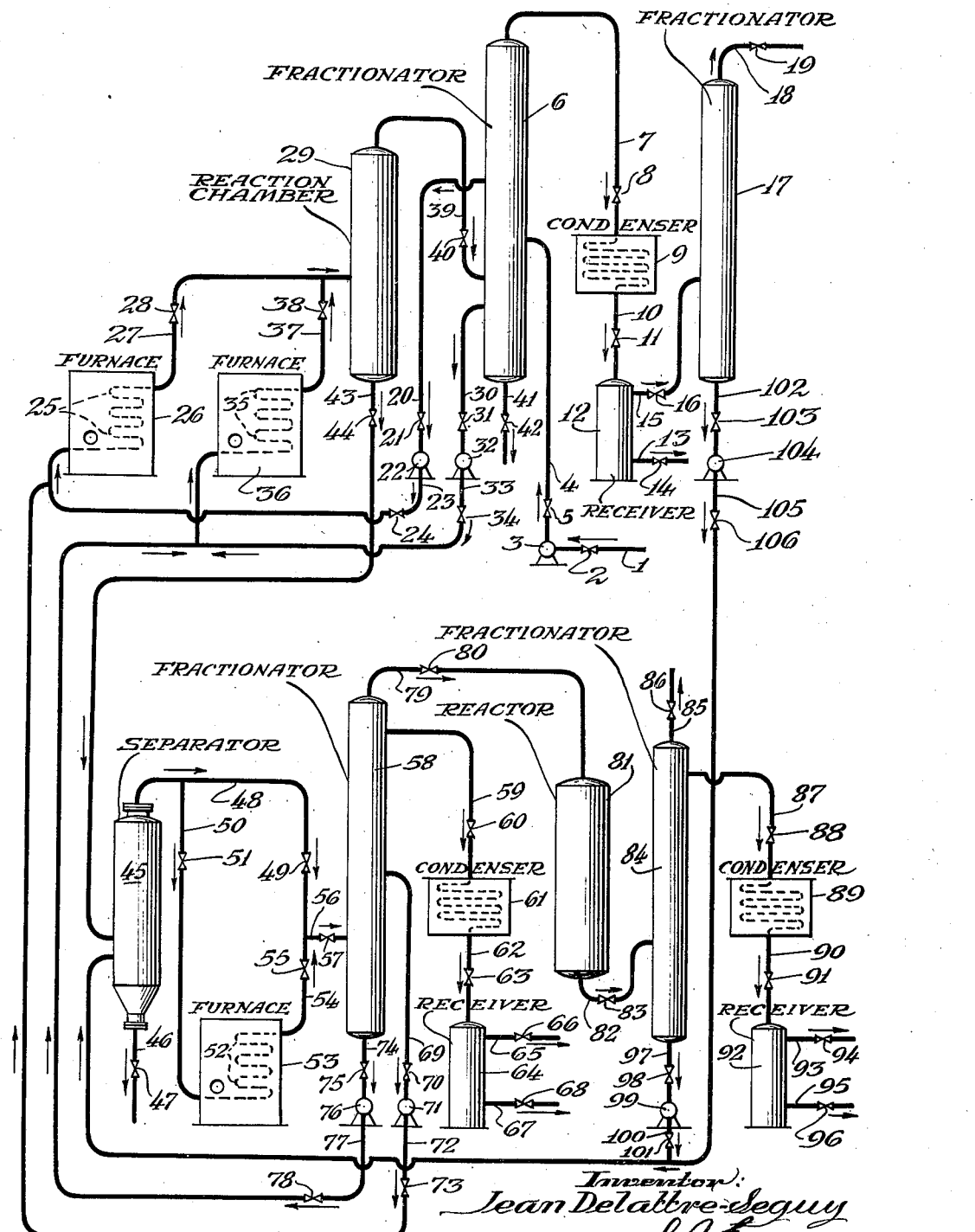

2,310,123

UNITED STATES PATENT OFFICE 2,310,123

TREATMENT OF HYDROCARBON OILS

Jean Delattre Seguy, Washington, D. C., assignor to Universal Oil Products Company, Chicago, Ill., a corporation of Delaware Application November 17, 1941, Serial No. 419,402

3 Claims. (Cl. 196—10)

This invention relates to the treatment of hydrocarbon oils by combination cracking and gas polymerizing steps to effect a high degree of conversion of relatively heavy charging oils into light products of motor fuel boiling range and good antiknock characteristics.

More specifically, the invention comprises a series of cooperative steps in which the various fractions of raw oil charging stock and the partially cracked products are selectively treated to accomplish the objectives mentioned.

In one specific embodiment, the present invention comprises fractionating in a primary step a charging oil and cracked products to produce therefrom light gases, heavy readily liquefiable gases, gasoline, light reflux condensate, heavy reflux condensate and residuum; separately recovering said light gases and residuum, passing said heavy liquefiable gases to a subsequent residuum flashing step, condensing and recovering said gasoline, separately heating said light and heavy reflux condensates under conversion conditions of temperature and pressure in admixture with corresponding light and heavy reflux condensates produced in fractionating in a secondary step the products from cracking the vapors from said residuum flashing step, passing the products resulting from cracking said light and heavy reflux condensates to a reaction chamber, fractionating in said primary step the vapors from said reaction chamber along with said charging oil to produce said gases, gasoline reflux condensates and residuum, recovering residuum from said residuum flashing step, separately cracking the vapors from said residuum flashing step under substantially vapor phase conditions and fractionating in a secondary step to produce olefin-containing gases, gasoline and light and heavy reflux condensates, subjecting said olefin-containing gases to contact with a polymerizing catalyst to form gasoline boiling range polymers from the olefins in said olefin-containing gases, fractionating said polymers in a tertiary step to produce gases, gasoline and polymers heavier than gasoline, recovering polymer gasoline fractions and passing said heavy polymer fractions to said residuum flashing step.

In order to bring out the features of the present invention more definitely, the inter-related operations of the process will be described in connection with the attached drawing which diagrammatically illustrates an arrangement of apparatus in which the process may be conducted.

Referring to the drawing, a charging oil which may be a crude petroleum containing both gas and gasoline is introduced to the plant by way of line 1 containing valve 2 to a charging pump 3 which discharges through line 4 containing valve 5 into a fractionator 6 which operates to fractionate the charging oil as well as the cracked products from reaction chamber 29 to be presently described. Fractionator 6 is of a design and capacity suitable for effecting a more or less sharp separation of the entering materials into overhead vapors comprising gases and gasoline, a relatively light reflux condensate material, a relatively heavy reflux condensate material and residual material unsuitable for cracking treatment. The overhead vapors comprising both fixed gases and gasoline pass through vapor line 7 containing valve 8 through a condenser 9 in which gasoline boiling range vapors are condensed and the products from the condenser pass through line 10 containing valve 11 to receiver 12, from which gasoline is withdrawn through line 13 containing valve 14. The gases from the receiver 12 pass through line 15 containing valve 16 to a secondary fractionator 17 which is designed to separate light gases comprising principally hydrogen, methane, ethane and ethylene from heavier gases comprising essentially propane, propene, butanes, and butenes, the light gases being vented through line 18 containing valve 19 for storage or use as fuel or for any other purpose to which they may be suited. Heavier readily liquefiable gases pass through line 102 containing valve 103 to a point which will be described later. Such obvious necessary features as heating means between receiver 12 and fractionator 17 and the commonly used expedient of controlling fractionation by the use of a portion of fractionator overhead as reflux condensate have not been shown in connection with fractionators 6 and 17 although any of these may be employed within the scope of the invention. Residual materials from fractionator 6 are withdrawn through line 41 containing valve 42.

One of the features of the present invention is the separate heating of light and heavy reflux condensates from fractionator 6 along with corresponding reflux condensates from a subsequent cracking step under conditions best suited for cracking them for the production of optimum yields and quality of the gasoline from each. In accordance with the flow indicated in the drawing, a light reflux condensate may be withdrawn as a side cut from fractionator 6 through line 20 containing valve 21 to a pump 22 which discharges through line 23 containing valve 24, to a tubular heating element 25 disposed to receive heat from a furnace 26. Heating element 25 receives also light reflux condensate from line 72 as will be described at a later point.

A heavier reflux condensate is withdrawn at a lower level as a side cut from fractionator 6 and passed through line 30, containing valve 31, to a pump 32 which discharges through a line 33 containing a valve 34 to a heating element 35 arranged to be heated by a furnace 36. Heating element 35 also receives a reflux condensate from line 77 as will be described at a later point.

The heated and partially cracked products from heating element 25 pass through line 27, containing valve 28 to reaction chamber 29 along with analogous products from heating element 35 which pass through line 37 containing valve 38.

Reaction chamber 29 is preferably of sufficient capacity to permit time for the desired conversion reactions to take place. The vapors from the reaction chamber 29 pass through line 39 containing valve 40 to fractionator 6 for separation into fractions as already described. Residual material from reaction chamber 29 is withdrawn through line 43 containing valve 44 to separator or flash chamber 45 which preferably is operated at a lower pressure than that employed in reaction chamber 29. Separator 45 receives heavy polymer fractions from line 100 and heavy readily liquefiable gases from line 105 as will be subsequently described.

Residual material in separator 45 is withdrawn through line 46 containing valve 47 while the vapors pass into line 48. The vapor stream at this point may be split so that a portion passes through line 48 containing valve 49 and thence by way of line 56 containing valve 57 to fractionator 58. The remainder, and usually the major portion of the vapors, passing through line 50 containing valve 51 through a heating element 52 disposed to receive heat from a furnace 53 in which they are subjected to further conversion under vapor phase conditions. The conversion products from heating element 52 pass through line 54 containing valve 55 and thence into fractionator 58 by way of line 56 containing valve 57. These cracked products will contain high percentages of readily polymerizable olefins and fractionator 58 is preferably operated to produce gases of high olefin content, gasoline and both light and heavy reflux condensates. For effecting these separations, it is comprised within the scope of the invention to use more than the single fractionator indicated in the drawing. Gasoline vapors pass through line 59 containing valve 60 and are condensed during passage through a condenser 61, the condensed gasoline and any uncondensed gases passing through line 62 containing valve 63 to receiver 64 which is provided with a conventional gas release line 65 containing valve 66 and a gasoline drawoff line 67 containing valve 68 for the recovery of gasoline boiling range product.

In accordance with the invention, a light reflux condensate is removed as a side cut from fractionator 58 through line 69 containing valve 70 and passed to pump 71 which discharges through line 72 containing valve 73 to heating element 25 as previously described. Heavy reflux condensates from fractionator 58 are withdrawn through line 74 containing valve 75 to pump 76 which discharges through line 77 containing valve 78 to heating element 35 as previously described.

Olefin-containing gases are removed from fractionator 58 through line 79 containing valve 80 and passed through a reactor 81 containing preferably granular catalytic material capable of effecting substantial polymerization among the three and four carbon atom olefins or the so-called "higher olefins." The polymerizing zone indicated diagrammatically as reactor 81 may commonly consist of a number of reactors in parallel or series connection through which the olefin-containing gases are passed in one or a group of reactors while the catalyst in another reactor or another group of reactors is undergoing regeneration by burning off deposited carbonaceous material with air or other oxidizing gas mixtures, the flow through the reactors being alternated as the spent catalyst is regenerated and the fresh catalyst becomes spent.

Among the types of granular catalysts which may be used in the polymerizing zone designated by reactor 81 may be mentioned the so-called "solid phosphoric acid catalysts" which are usually prepared by calcining pasty mixtures of phosphoric acids and a siliceous material such as kieselguhr to produce a solid cake which is ground and sized to produce granular catalyst particles. This procedure may be varied as desired by forming particles by the extrusion of the primary pasty mixtures to produce particles which are subsequently calcined. When using granular catalysts of this type, the temperature employed may vary from about 250 to about 550° F., but preferably from about 400 to about 500° F. in most cases while the pressure may vary from about 100 to about 500 pounds per square inch.

Obviously, when the pressure utilized in the polymerizing zone is higher than that employed in the preceding fractionator, some type of pump or compressor will have to be used along the line of flow of line 79. Similarly, heating means will usually be necessary to bring the temperature up to that optimum for effecting polymerization. Such pumps and heaters have been omitted from the present drawing in the interest of simplification.

Alternatively, with the solid phosphoric acid catalyst described, other granular catalysts of similar effectiveness may be employed as desired, or liquid sulphuric acid may be used either in the so-called "hot" process or in the so-called "cold" process in which latter process esters first formed by the interaction of the olefins and sulphuric acid at a relatively low temperature are subsequently decomposed at a higher temperature to yield reactive radicals which polymerize to form the desired polymer products. When using liquid polymerizing catalysts such as sulphuric acid, the actual construction of the polymerizing zone will require modification.

As indicated in the drawing, the total products from the polymerizing step comprising normally liquid polymers of various boiling ranges, residual three and four carbon atom hydrocarbons containing only minor amounts of olefins and lighter gases pass through line 82 containing valve 83 to a fractionator 84 from which the lighter gases mentioned are vented through line 85 containing valve 86. The vapors of gasoline boiling range polymers are removed through line 87 containing valve 88 and condensed during passage through condenser 89, both condensed and uncondensed materials passing through run down line 90 containing valve 91 to receiver 92 which has a gas release line 93 containing valve 94 for the removal of fixed gases and a polymer drawoff line 95 containing valve 96 for the removal of gasoline boiling range polymers.

In accordance with the present invention, polymers having a boiling range higher than gasoline are returned to the residuum flashing zone for eventual recycling to further cracking. Thus such heavy polymers are removed from the bottom of fractionator 84 through line 97 containing valve 98 to a recycle pump 99 which discharges into line 100 containing valve 101 and leading to line 105 containing valve 106, the discharge line from pump 104, which in turn conducts the heavy polymers plus heavy gas from fractionating zone 17 back to separator 45.

To avoid complicating the schematic flow shown in the drawing, means for regulating the temperature of the effluent materials from reaction zone 81 before their admission to fractionator 84 are omitted as is also any subsequent stabilizing step which may be practiced upon the gasoline boiling range polymers collected in receiver 92.

While the temperatures and pressures employed at various points in the process may vary widely without departing from the scope of the invention, a few ranges may be mentioned as being preferable. In the two reflux condensate cracking zones designated as heating coils 25 and 35, the temperatures at the exit of the coils may be of the order of from 850 to 1050° F. although most commonly they will be of the order of from about 900 to about 1000° F., the temperature in coil 25 operating on light reflux condensates being usually higher than that employed in coil 35, operating upon heavier reflux condensates. Pressures in these two cracking coils and the succeeding reaction chamber may vary within the approximate range of from about 100 to about 500 pounds per square inch or higher. In separator or "flash chamber" 45, the pressure is preferably lower than that in reaction chamber 29 and may be less than 100 pounds per square inch. The temperature at the exit of vapor phase heating element 52 is commonly of from about 900 to about 1000° F., while the pressure is lower than that employed in the light and heavy reflux condensates cracking coils to favor greater production of olefin-containing gases.

The temperatures and pressure employed in the various fractionating zones may be determined by the nature of the materials admitted for fractionation and the closeness of the fractionation desired and the invention comprises the use of any necessary combinations of temperature, pressure, reflux condensate and capacity.

The gasoline boiling range materials produced at several points in the plant such as receivers 12, 64, and 92 may be separately collected and blended in any desired proportions to produce gasolines of varying compositions and antiknock value.

The following data are introduced to indicate the character of the results normally obtainable in the operation of the present process, but since the example is merely illustrative it is not to be considered as imposing undue limitations upon the proper scope of the invention.

A Mid-Continent crude oil may be charged to a plant such as the one indicated in the description in connection with the drawing, this crude oil being from the Mid-Continent producing area, having an A. P. I. gravity of about 36° and a natural gasoline content of 22 per cent. By following the general flow indicated with separate heating of light and heavy reflux condensates from the primary fractionator and the secondary fractionator operating upon vapor phase cracked products, followed by polymerization of the olefinic gases from the vapor phase operation, the following yields may be obtained based on the crude charged.

| Product | Yield | Octane number |
|---|---|---|
|  | Volume per cent |  |
| Fixed gases | [1] 3 |  |
| Natural gasoline | 22 | 62 |
| Gasoline from cracking | 43 | 72.5 |
| Gasoline polymers | 7 | 83.5 |
| Straight-run residuum | 20 |  |
| Cracked residuum | 5 |  |

[1] Liquid equivalent.

The blend of the total gasoline from the above operation may have an octane number of 70 and it will be seen that this represents 72 per cent of the crude oil charged.

I claim as my invention:

1. A hydrocarbon conversion process which comprises fractionating cracked vapors, formed as hereinafter set forth, and charging oil to separate light gases, heavy readily liquefiable gases and gasoline and to condense and separate light reflux condensate and heavy reflux condensate, subjecting said light and heavy reflux condensates to cracking under independently controlled cracking conditions, supplying resultant conversion products from both cracking steps to a reaction and separating zone and therein separating said cracked vapors from liquid residuum, combining at least a portion of said residuum with said heavy liquefiable gases, supplying the mixture to a reduced pressure vaporizing and separating zone and therein separating vapors from non-vaporous residue, cracking said vapors independently of the condensate fractions, fractionating the resultant conversion products from the last mentioned cracking step independently of said cracked vapors to separate olefin-containing gases and gasoline and to condense and separate light and heavy reflux condensates, combining the light and heavy reflux condensate formed in the last mentioned fractionating step with the corresponding fraction separated in the first mentioned fractionating step for treatment as aforesaid, subjecting said olefin-containing gases to polymerization to form gasoline boiling polymers, separating polymers heavier than gasoline from the resultant polymerization products in an independent separating step and supplying the heavy polymers to said reduced pressure vaporizing and separating step.

2. The process of claim 1 further characterized in that the olefin-containing gases are polymerized in the presence of a sulfuric acid catalyst.

3. The process of claim 1 further characterized in that the olefin-containing gases are polymerized in the presence of a phosphoric acid catalyst.

JEAN DELATTRE SEGUY.